United States Patent [19]

Glines

[11] Patent Number: 4,949,559
[45] Date of Patent: * Aug. 21, 1990

[54] ARTICLE LOCK

[75] Inventor: James A. Glines, Indianapolis, Ind.

[73] Assignee: Meyer Plastics, Inc., Indianapolis, Ind.

[ * ] Notice: The portion of the term of this patent subsequent to Nov. 21, 2006 has been disclaimed.

[21] Appl. No.: 405,880

[22] Filed: Sep. 11, 1989

Related U.S. Application Data

[62] Division of Ser. No. 199,027, May 26, 1988, Pat. No. 4,881,386.

[51] Int. Cl.$^5$ ............................................. E05B 73/00
[52] U.S. Cl. ................................... 70/19; 70/58; 70/277; 70/279; 211/64
[58] Field of Search ................... 70/14, 19, 277–279, 70/57, 58; 211/4, 64; 248/551–553

[56] References Cited

U.S. PATENT DOCUMENTS

| | | | |
|---|---|---|---|
| 1,495,883 | 5/1924 | Chadwick et al. | 70/19 |
| 1,872,092 | 8/1932 | Neverman | 70/159 |
| 2,316,995 | 4/1943 | Smith | 211/64 |
| 2,668,645 | 2/1954 | Pease . | |
| 2,721,470 | 10/1955 | Hensel | 70/346 |
| 3,095,725 | 7/1963 | Unsworth | 70/346 |
| 3,200,623 | 8/1965 | Peters | 70/279 |
| 3,241,344 | 3/1966 | Peters | 70/279 |
| 3,304,755 | 2/1967 | Johnstone | 70/279 |
| 3,326,385 | 6/1967 | Pinkerton et al. | 211/4 |
| 3,543,547 | 12/1970 | Sugiyama et al. | 70/277 |
| 3,767,093 | 10/1973 | Pinkerton | 211/64 |
| 3,802,612 | 4/1974 | Smith | 211/64 |
| 3,857,491 | 12/1974 | Townsend et al. | 211/8 |
| 4,132,315 | 1/1979 | Young | 211/4 |
| 4,226,399 | 10/1980 | Henderson | 248/553 |
| 4,296,615 | 10/1981 | Zoor | 70/19 |
| 4,364,499 | 12/1982 | McCue | 211/64 |
| 4,426,864 | 1/1984 | Morikawa | 70/431 |
| 4,648,638 | 3/1987 | McKnight | 292/144 |
| 4,738,126 | 4/1988 | Haberle | 70/14 |
| 4,747,280 | 5/1988 | Shaw | 70/279 |

FOREIGN PATENT DOCUMENTS 2185064 7/1987 United Kingdom .

OTHER PUBLICATIONS

Advertisement, Law Enforcement Equipment Company, 1987–1988, Catalog, p. 161, (e.g., Smith & Wesson Gun Locks and Fletcher Key Gun Lock).
Advertisement, Gall's Inc., Catalog No. 22, p. 26 (e.g., Vertical Gun Lock #52-7110).
Advertisement, SaSo 1987–1988, Catalog No. 189, p. 338 (e.g., Lektro Lok II Shotgun Holder 61B942).

*Primary Examiner*—Gary L. Smith
*Assistant Examiner*—Suzanne L. Dino
*Attorney, Agent, or Firm*—Barnes & Thornburg

[57] ABSTRACT

A locking bolt is provided in a mount for receiving a gun barrel or other article. The locking bolt can be cammed relative to the mount from its normally locked position to an unlocked position to permit release of the gun barrel from the mount. The locking bolt is cammed to its unlocked position in response to direct engagement with a key inserted into an interior region of the mount and rotated relative to the mount. Thus, the mount is formed to include a keyway configured to permit the key itself to impart motion to a locking bolt to unlock the mount.

21 Claims, 1 Drawing Sheet

U.S. Patent
Aug. 21, 1990
4,949,559
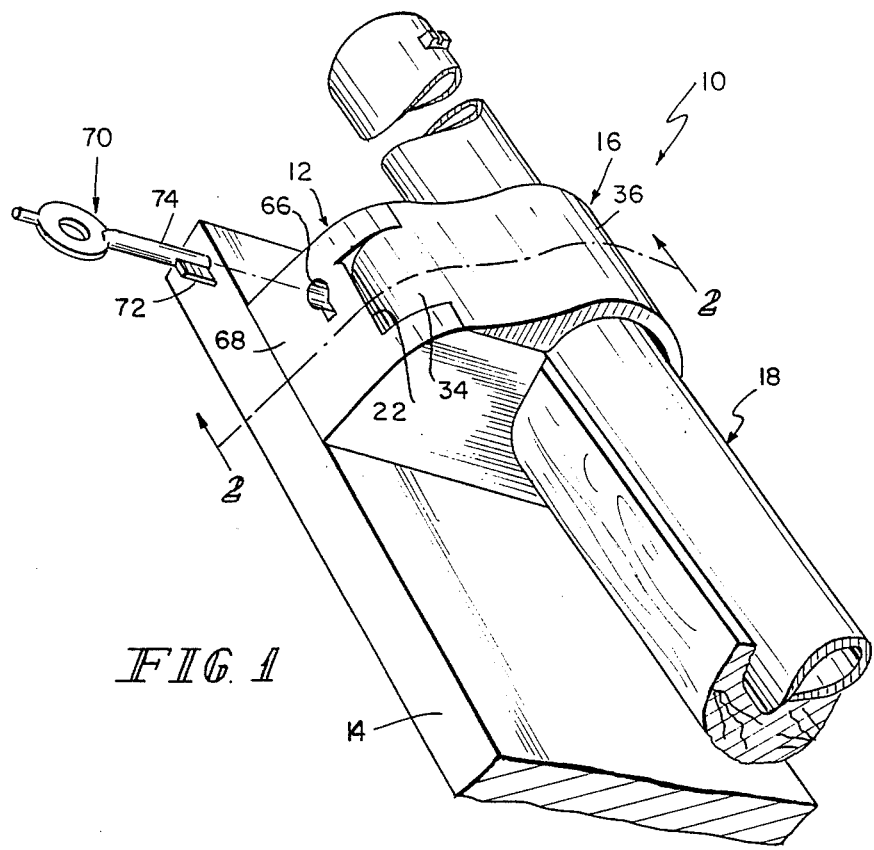
FIG. 1
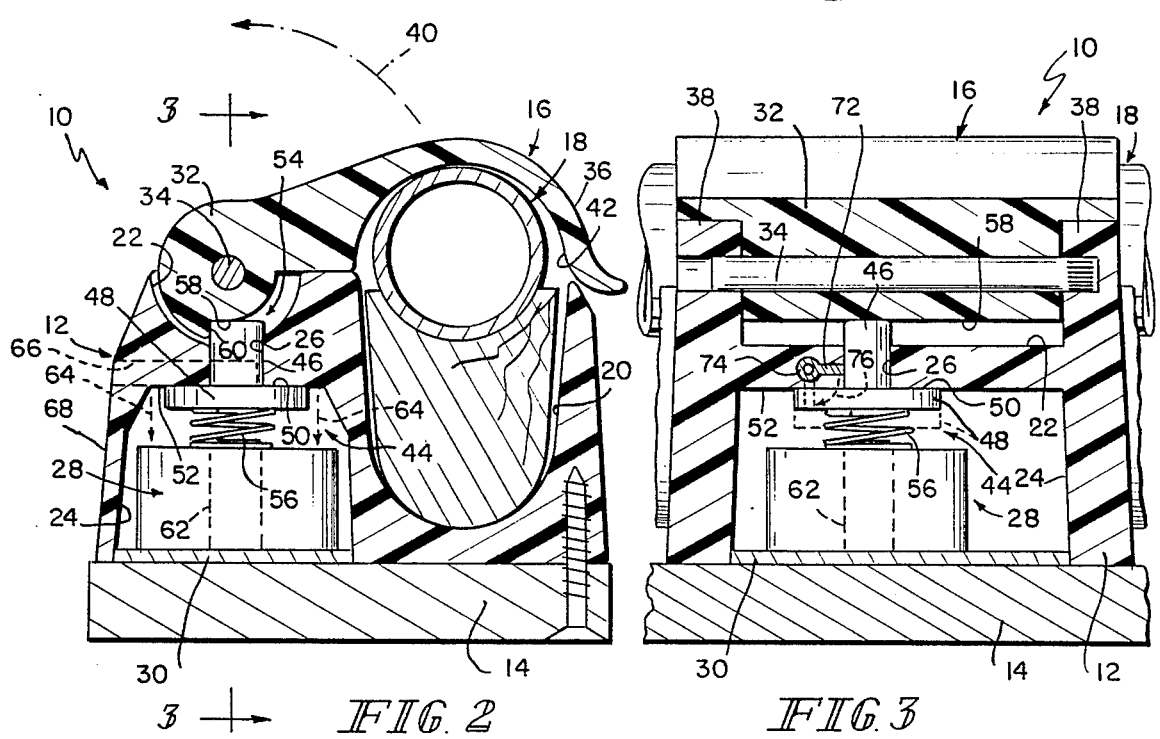
FIG. 2
FIG. 3 ic Lock

This is a division of application Ser. No. 07/199,027 filed May 26, 1988, now U.S. Pat. No. 4,881,386.

BACKGROUND AND SUMMARY OF THE INVENTION

The present invention relates to an article lock, and particularly to an assembly for releasably locking a gun or other article in a secure position to prevent unauthorized access to the gun. More particularly, the present invention relates to an assembly for releasing a gun or other article from a locked secure position using either remote control or key-actuated means at the selection of a user.

Law enforcement officers carry various types of shotguns, assault rifles, and other weapons in their vehicles for use in carrying out law enforcement duties. These weapons are typically holstered in a gun mount fastened securely to an interior portion of the vehicle. It is recognized that the need of officers to have ready access to their holstered weapon in an emergency must be balanced against the risk of permitting intruders to have unauthorized access to such weapons.

One object of the present invention is to provide a locking bolt in a mount for receiving a gun barrel or other article that is cammed relative to the mount from its normally locked position to an unlocked position to permit release of the gun barrel from the mount in response to direct engagement with a moving key inserted into an interior region of the mount. In essence, the mount is configured to permit the key itself to impart motion to a locking bolt free to move relative to the mount to permit a weapon or other article to be released from the mount.

Another object of the present invention is to provide a mountable assembly configured to lock a weapon or other article in a secure but accessible position and release on command such weapon from its confined position using either remote control or key-actuated means.

Yet another object of the invention is to provide a locking bolt in a mount for receiving a gun barrel or other article that is retractable to unlock the mount using either a remotely controlled actuator to provide an automatic gun barrel release system or a bolt-engaging key operable without activating the remotely controlled actuator to provide a mechanical override to the automatic gun barrel release system.

According to the present invention, a lock is provided for securing a weapon or other article in a secure position. The article lock includes means for receiving an article and means for releasably retaining the article in the receiving means. The retaining means is movable relative to the receiving means. A single blocking means for blocking movement of the retaining means relative to the receiving means is included to fix the retaining means in a predetermined locking position locking the article in the receiving means.

The blocking means is movable between a projected position engaging the retaining means and a retracted position away from the retaining means. The receiving means is formed to include means for introducing key means to the blocking means so that the key means is movable to act on the blocking means to move the blocking means to its retracted position, thereby permitting movement of the retaining means relative to the receiving means to release the article.

In preferred embodiments, the retaining means includes a distal retainer arm and a proximal shoulder. The arm acts to retain the article in the receiving means upon movement of the retaining means to its predetermined position. The proximal shoulder is pivotably connected to the receiving means to permit pivoting movement of the retaining means relative to the receiving means.

The blocking means includes a bolt and the proximal shoulder of the retaining means is formed to include a slot for receiving the bolt upon movement of the blocking means to its projected position. The retaining means further includes a pivot-blocking wall defining a portion of the slot. The pivot-blocking wall is aligned to engage the blocking means to limit pivoting movement of the retaining means and the receiving means so that articles such as gun barrels are securely retainable in the receiving means.

Spring means is also provided for yieldably biasing the bolt into the bolt-receiving slot to engage the shoulder of the retainer arm. Thus, the spring means normally causes the bolt to be moved to a position locking the retainer arm to prevent release of an article in the receiving means.

The blocking means further includes a cam follower attached to the bolt and situated in an interior region of the receiving means to communicate with the introducing means. The follower is thus positioned to be acted on by a portion of the key means during rotation of the key means to move the blocking means to its retracted position. Essentially, rotation of a key introduced into the receiving means of the present invention causes the key to act as a cam in relation to the bolt and withdraw the bolt from the bolt-receiving slot, thereby permitting relative movement between the distal retainer arm and the receiving means to release the article. In preferred embodiments, the key means comprises a key inserted into the introducing means.

Actuating means is also provided for selectively moving the blocking means from its projected position to its retracted position. The actuating means communicates with the blocking means to permit the blocking means to be moved to its retracted position under the control of a key rotated in the introducing means to act on the blocking means independent of operation of the actuating means to provide mechanical override means for retracting the blocking means upon malfunction of the actuating means.

One feature of the invention is the provision of means in the receiving means for introducing a key to the blocking means so that the key is movable in the introducing means to act on the blocking means to move the blocking means to its retracted position. Advantageously, such a configuration of the receiving means permits an operator to use a key as a cam against the blocking means to release an article such as a gun barrel from a trapped position in the receiving means. It is thus unnecessary to install a separate lock cylinder or core in the receiving means to control keyed actuation of the blocking means. Cost and size of the article-receiving means are thereby minimized.

A wide variety of bitted keys, including, but not limited to, typical police handcuff keys, are well suited for insertion into the introducing means of the present invention to unlock the blocking means. One advantage realized by configuration of the introducing means to admit a handcuff key to actuate the blocking means is that such handcuff keys are easily distinguished from other available keys by law enforcement officers. This is especially desirable during an emergency situation when it becomes necessary for those officers to use the key-actuated mechanical override system to gain access to a secured weapon.

Another feature of the invention is the establishment of communication between the blocking means and the actuating means which permits the blocking means to be moved to its retracted position under the control of a key rotated in the introducing means independent of operation of the actuating means. Illustratively, such communication is provided by including an electromagnet in the actuating means and forming at least a portion of the blocking means out of magnetic material.

Advantageously, such a feature enables an operator to select the actuation mode best suited at the time it becomes necessary to gain access to a secured weapon. For example, a single button situated in a location known only to the operator can be used to activate the actuating means. Alternatively, a key can be used as a mechanical override to operate the lock mechanism upon, for example, malfunction or loss of power of the actuating means. Specifically, the key acts to cam the blocking means to a retracted position without damaging the "coupling" existing between the blocking means and the actuating means necessary to provide an operable connection therebetween.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a perspective view of a preferred embodiment of the present invention showing a key operable to release a gun barrel from a secured position;

FIG. 2 is a transverse sectional view of the embodiment illustrated in FIG. 1 taken along lines 2—2 showing the retainer arm in its article-retainer position; and FIG. 3 is a sectional view taken along lines 3—3 of FIG. 2 illustrating the rotatability of a key inserted into a keyway formed in the base to engage a follower on a locking bolt in camming relation.

DETAILED DESCRIPTION OF THE INVENTION

Gun mounts are typically installed in vehicles driven by law enforcement officers to provide officers with ready access to shotguns and assault rifles in the vehicles during emergency situations. A preferred embodiment of a gun mount in accordance with the present invention is illustrated in FIGS. 1-3. It is expected that this mount will be used in combination with a conventional butt socket or other mounting bracket to support a gun in a releasable locked secure position in a vehicle or elsewhere. However, it will be appreciated by those skilled in the art that the mount of the present invention is well suited to receive, hold, or lock many articles other than guns or weapons.

Referring to FIG. 1, an improved gun mount 10 is shown to include a base 12 mounted on a foundation 14 and a retainer arm 16 pivotably connected to base 12.

Base 12 and retainer arm 16 cooperate to define an aperture therebetween for receiving a gun barrel 18 or the like upon movement of the retainer arm 16 to its closed position as shown in FIG. 1. It will be appreciated that base 12 can be configured to mount on a variety of foundations 14 such as floors, overhead screens, and trunk lids to provide floor, horizontal, and trunk mounts, respectively (not shown). Advantageously, these mounting positions permit a gun to be mounted either muzzle down, horizontally, or vertically in a vehicle. Gun mount 10 is well-suited for use in each case.

Base 12 is formed to include an article-receiving channel 20 and a separate annular groove 22 opening away from foundation 14, a control chamber 24 opening toward foundation 14, and a bolt-receiving passageway 26 interconnecting the control chamber 24 and the annular groove 22 as shown best in FIG. 2. Control chamber 24 is sized and configured to contain an actuator assembly 28 operable by remote control to unlock the gun mount 10 to permit release of a gun barrel 18 retained in article-receiving channel 20. A cover plate 30 is connectable to base 12 to hold actuator assembly 28 in control chamber 24.

Retainer arm 16 includes a proximal portion 32 rotatably mounted on a hinge pin 34 and a distal portion 36. As shown best in FIG. 3, hinge pin 34 is coupled at its opposite ends to upstanding ears 38 of base 12 to extend across a valley provided by annular groove 22. Retainer arm 16 is pivotable in the direction of phantom arrow 40 about a transverse axis defined by hinge pin 34 between a closed article-retaining position shown in FIGS. 2 and 3 to an open article-releasing position (not shown).

The distal portion 36 of retainer arm 16 is formed to include a concave closure wall 42 for receiving a portion of gun barrel 18 upon movement of retainer arm 16 to its closed position as shown in FIG. 2. In this way, the retainer arm 16 and base 12 can cooperate to retain a gun barrel 18 or other article in the gun mount 10.

A locking pin 44 is reciprocable in passageway 26 to control pivotability of retainer arm 16 relative to base 12. Locking pin 44 includes a bolt 46 slidably received in passageway 26 and a head 48 movable within control chamber 24. Head 48 includes a flat-faced cam follower 50 for engaging a downwardly facing inner wall 52 to limit upward movement of locking pin 44 relative to base 12. Inner wall 52 defines one boundary of control chamber 24 as shown in FIGS. 2 and 3.

Bolt 46 is configured to engage a slot 54 formed in the proximal portion 32 of retainer arm 16 to block pivoting movement of retainer arm 16 in direction 40 upon movement of bolt 46 to its projected position as shown in FIGS. 2 and 3. Compression spring means 56 acts between head 48 and actuator assembly 28 normally to yieldably urge bolt 46 of locking pin 44 to its projected position, thereby effectively preventing pivoting of retainer arm 16 to a position permitting release of an article situated in channel 20 of base 12.

In particular, proximal portion 32 includes a bolt-stopping wall 58 for engaging a top wall of bolt 46 and a pivot-blocking wall 60 for engaging a side wall of bolt 46 as shown best in FIG. 2. Walls 58 and 60 cooperate to define the transverse slot or opening 54 formed in the retainer arm 16. As shown best in FIG. 2, passageway 26 has its upper opening facing slot 54 to permit engagement of bolt 46 and pivot-blocking wall 60.

Actuator assembly 28 is operable by remote control means to retract locking pin 44 into control chamber 24, disengaging the proximal portion 32 of the retainer arm 16. In the illustrated embodiment, locking pin 44 is made of a magnetic material such as steel and a fixed core 62 is energized by coil means (not shown) in assembly 28 to generate a magnetic field which applies a force sufficient to move locking pin 44 in the direction of arrows 64 and in opposition to compression sprinq means 56 to a retracted position (not shown). It is expected that button means (not shown) mounted in a hidden location within the vehicle is operable by a law enforcement officer aware of such location to activate the actuator assembly 28 and withdraw locking pin 44 from pivot-blocking engagement with retainer arm 16.

An easily operated mechanical override system is provided in gun mount 10 to enable an officer to unlock the retainer arm 16 by manually retracting locking pin 46 in the event that the hidden button means is not accessible or the actuator assembly 28 is disabled due to malfunction or loss of power. In particular, base 12 is formed to include a keyway 66 having an inlet opening in an exterior wall 68 of base 12 and an outlet opening in inner wall 52 opposite to flat-faced cam follower 50 of locking pin head 48. Keyway 66 is sized and configured to accept a bitted key 70 such as a typical police handcuff key and to permit rotation of key 70 therein about its longitudinal axis. The outlet opening of keyway 66 is sized and configured so that the bit means 72 on the blade 74 of key 70 engages the follower 50 in camming relation upon rotation of key 70 in keyway 66 to urge the locking pin 44 against compression spring means 56 to its retracted position in response to continued rotation of key 70.

Essentially, rotation of key 70 in keyway 66 causes bit means 72 to rotate in the direction of arrow 76 to extend from keyway 66 into control chamber 24 as shown in FIG. 3. Such movement of key 70 causes bit means 72 to act on the flat-faced cam follower 50 to, in effect, disengage bolt 46 from retainer arm 16, thereby permitting movement of retainer arm 16 to an article-releasing position without operating or damaging actuator assembly 28. It will be appreciated that compression spring means 56 is configured and positioned underneath head 48 to stabilize locking pin 44 during camming engagement with bit means 72 to minimize disruptive cocking or rocking of bolt 46 in passageway 26 during use of the manually operated mechanical override system.

The configuration of keyway 66 is well-suited for use with a typical police handcuff key. Advantageously, such a key provides adequate security and, at the same time, is easily accessible by a law enforcement officer during an emergency. Moreover, by use of such a simple cam system of the type employed in the present invention, the need for specially bitted keys and for costly and bulky lock components such as cylinders, cores, and tumbler pins are eliminated to provide an efficient, economical mount for locking guns or other articles.

Although the invention has been described in detail with reference to a preferred embodiment, variations and modifications exist within the scope and spirit of the invention as described and defined in the following claims.

What is claimed is:

1. An article lock comprising
means for receiving an article,
means for releasably retaining the article in the receiving means, the retaining means being movable relative to the receiving means, and
a single blocking means for blocking movement of the retaining means relative to the receiving means to fix the retaining means in a predetermined locking position locking the article in the receiving means, the blocking means being movable by an actuating means between a projected position engaging the retaining means and a retracted position away from the retaining means, the receiving means being formed to include means for introducing a key means to the blocking means so that the key means is movable to act on the blocking means independent of the actuating means to move the blocking means to its retracted position, thereby permitting movement of the retaining means relative to the receiving means to release the article.

2. The article lock of claim 1, wherein the retaining means includes a distal retainer arm acting to retain the article in the receiving means upon movement of the retaining means to the predetermined locking position and a proximal shoulder pivotably connected to the receiving means to permit pivoting movement of the retaining means relative to the receiving means.

3. The article lock of claim 2, wherein the blocking means includes a bolt and the proximal shoulder of the retaining means is formed to include an opening for receiving the bolt upon movement of the blocking means to its projected position to limit relative movement of the retaining means and the receiving means.

4. The article lock of claim 3, further comprising spring means for yieldably biasing the bolt into engagement with the retaining means in the bolt-receiving opening.

5. The article lock of claim 3, wherein the blocking means further includes a cam follower attached to the bolt and situated in an interior region of the receiving means to communicate with the introducing means so that the cam follower is acted on by a portion of the key means during rotation of the key means to move the blocking means to its retracted position, thereby withdrawing the bolt from the bolt-receiving opening to permit relative movement between the distal retainer arm and the receiving means to release the article.

6. The article lock of claim 1, wherein the receiving means is formed to include passageway means for conducting the blocking means between its projected and retracted positions along a path through an interior region of the receiving means.

7. The article lock of claim 6, wherein the key means comprises a key inserted into the introducing means and the receiving means is formed to include a first opening interconnecting the introducing means and the passageway means to permit a portion of the key to extend into the passageway means in response to rotation of the key in the introducing means to engage the blocking means in camming relation and urge the blocking means toward its retracted position in response to continued rotation of the key.

8. The article lock of claim 7, wherein the receiving means is configured to provide a second opening of the passageway means adjacent to the retaining means, the blocking means includes a bolt extending through the passageway means to engage the retaining means in the projected position of the blocking means and a cam follower positioned in close proximity to the first opening in the projected position of the blocking means so that the cam follower is acted on by the portion of the key during rotation of the key in the introducing means to disengage the bolt and the retaining means, thereby permitting the retaining means to be moved away from its predetermined locking position to release the article.

9. The article lock of claim 7, further comprising actuating means for selectively moving the blocking means from its projected position to its retracted position, the actuating means communicating with the blocking means to permit the blocking means to be moved to its retracted position under the control of a key rotated in the introducing means to act on the blocking means independent of operation of the actuating means to provide mechanical override means for retracting the blocking means.

10. The article lock of claim 6, wherein the retaining means is formed to include a slot, the receiving means is formed to provide an opening of the passageway means in communication with the slot upon movement of the retaining means to its predetermined locking position, and the blocking means extends out of the passageway means into the slot in its projected position to fix the retaining means in its predetermined locking position.

11. The article lock of claim 10, wherein the retaining means is pivotably connected to the receiving means, the retaining means further includes a pivot-blocking wall defining a portion of the slot, and the pivot-blocking wall is aligned to engage the blocking means to limit pivoting movement of the retaining means relative to the receiving means.

12. An apparatus comprising
means for holding an article, and
a single blocking means for selectively blocking release of the article from the holding means, the blocking means being coupled to the holding means for movement relative thereto, the holding means being formed to include means for introducing a key to said single means so that the key is movable relative to the holding means independent of the actuating means to cam the blocking means to a position permitting release of the article from the holding means.

13. An apparatus comprising
means for receiving an article,
means for releasably retaining the article in the receiving means, the retaining means being movable relative to the receiving means,
a single blocking means for blocking movement of the retaining means relative to the receiving means to fix the retaining means in a predetermined locking position locking the article in the receiving means, the blocking means being movable by an actuating means between a projected position engaging the retaining means and a retracted position away from the retaining means, and
an actuator movable in the receiving means to move the blocking means independent of the actuating means relative to the receiving means to its retracted position, thereby permitting movement of the retaining means relative to the receiving means to release the article.

14. The apparatus of claim 13, wherein the retaining means includes a distal retainer arm acting to retain the article in the receiving means upon movement of the retaining means to the predetermined locking position and a proximal shoulder pivotably connected to the receiving means to permit pivoting movement of the retaining means relative to the receiving means.

15. The article lock of claim 14, wherein the blocking means includes a bolt and the proximal shoulder of the retaining means is formed to include an opening for receiving the bolt upon movement of the blocking means to its projected position to limit relative movement of the retaining means and the receiving means.

16. The apparatus of claim 15, further comprising spring means for yieldably biasing the bolt into engagement with the retaining means in the bolt-receiving opening.

17. The apparatus of claim 15, wherein the blocking means further includes a cam follower attached to the bolt and situated in an interior region of the receiving means to communicate with the introducing means so that the cam follower is acted on by a portion of the actuator during rotation of the actuator to move the blocking means to its retracted position, thereby withdrawing the bolt from the bolt-receiving opening to permit relative movement between the distal retainer arm and the receiving means to release the article.

18. The apparatus of claim 13, wherein the receiving means is formed to include passageway means for conducting the blocking means between its projected and retracted positions along a path through an interior region of the receiving means.

19. The apparatus of claim 18, wherein the actuator comprises a key inserted into the introducing means and the receiving means is formed to include a first opening interconnecting the introducing means and the passageway means to permit a portion of the key to extend into the passageway means in response to rotation of the key in the introducing means to engage the blocking means in camming relation and urge the blocking means toward its retracted position in response to continued rotation of the key.

20. The apparatus of claim 19, wherein the receiving means is configured to provide a second opening of the passageway means adjacent to the retaining means, the blocking means includes a bolt extending through the passageway means to engage the retaining means in the projected position of the blocking means and a cam follower positioned in close proximity to the first opening in the projected position of the blocking means so that the cam follower is acted on by the portion of the key during rotation of the key in the introducing means to disengage the bolt and the retaining means, thereby permitting the retaining means to be moved away from its predetermined locking position to release the article.

21. The apparatus of claim 19, further comprising actuating means for selectively moving the blocking means from its projected position to its retracted position, the actuating means communicating with the blocking means to permit the blocking means to be moved to its retracted position under the control of a key rotated in the introducing means to act on the blocking means independent of operation of the actuating means to provide mechanical override means for retracting the blocking means.

* * * * *